United States Patent
Tanaka et al.

[19]

[11] Patent Number: 5,945,019
[45] Date of Patent: Aug. 31, 1999

[54] METAL MEMBER CONNECTING STRUCTURE, METAL MEMBER CONNECTING METHOD, CERAMIC HEATER, AND CERAMIC HEATER MANUFACTURING METHOD

[75] Inventors: Arihito Tanaka; Chihiro Sakurai; Toshitsugu Miura, all of Saitama, Japan

[73] Assignee: Jidosha Kiki Co., Ltd., Japan

[21] Appl. No.: 09/015,297

[22] Filed: Jan. 29, 1998

[30] Foreign Application Priority Data

Jan. 30, 1997 [JP] Japan .................................. 9-16635

[51] Int. Cl.[6] ...................................................... H05B 3/08
[52] U.S. Cl. .......................................... 219/541; 219/544
[58] Field of Search ..................................... 219/541, 542, 219/544, 546, 270, 123, 505; 338/331, 322, 240, 238, 243, 276; 29/611, 619, 621

[56] References Cited

U.S. PATENT DOCUMENTS

| | | | |
|---|---|---|---|
| 4,060,710 | 11/1977 | Reuter et al. ........................ | 219/548 |
| 4,120,086 | 10/1978 | Crandell ............................. | 29/611 |
| 4,203,197 | 5/1980 | Crandell ............................. | 29/611 |
| 4,922,082 | 5/1990 | Bredt et al. ........................ | 219/541 |
| 4,988,848 | 1/1991 | Trakas .............................. | 219/421 |
| 5,682,732 | 11/1997 | Selberg ............................. | 53/477 |
| 5,683,606 | 11/1997 | Ushikoshi et al. .................. | 219/544 |
| 5,750,958 | 5/1998 | Okuda et al. ....................... | 219/267 |

FOREIGN PATENT DOCUMENTS 58-110919  7/1983  Japan .

*Primary Examiner*—Teresa Walberg
*Assistant Examiner*—Vinod D Patel
*Attorney, Agent, or Firm*—Townsend and Townsend and Crew; Kenneth R. Allen

[57] ABSTRACT

To join at least two metal members a connecting member made of a green ceramic body or ceramic sintered body having connecting a hole formed therein is used. After at least the two metal members are inserted in the hole of the connecting member to overlap their joining ends, they are sintered.

24 Claims, 7 Drawing Sheets

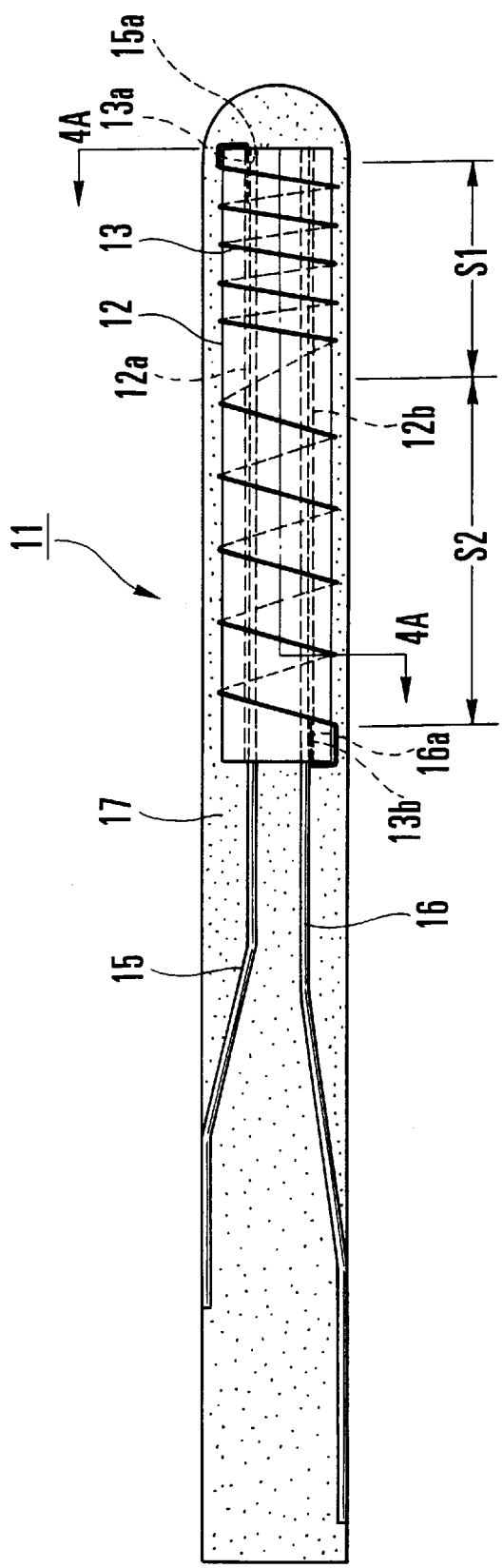
F I G. 4
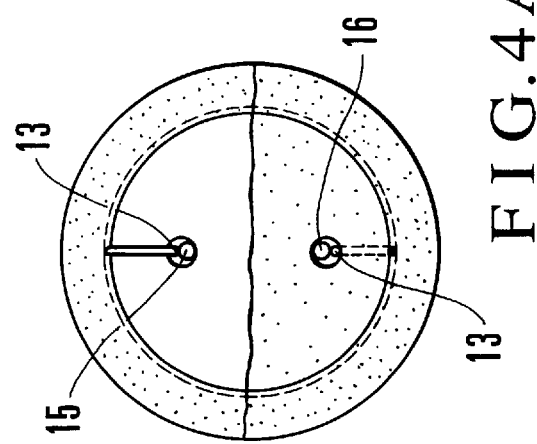
F I G. 4A

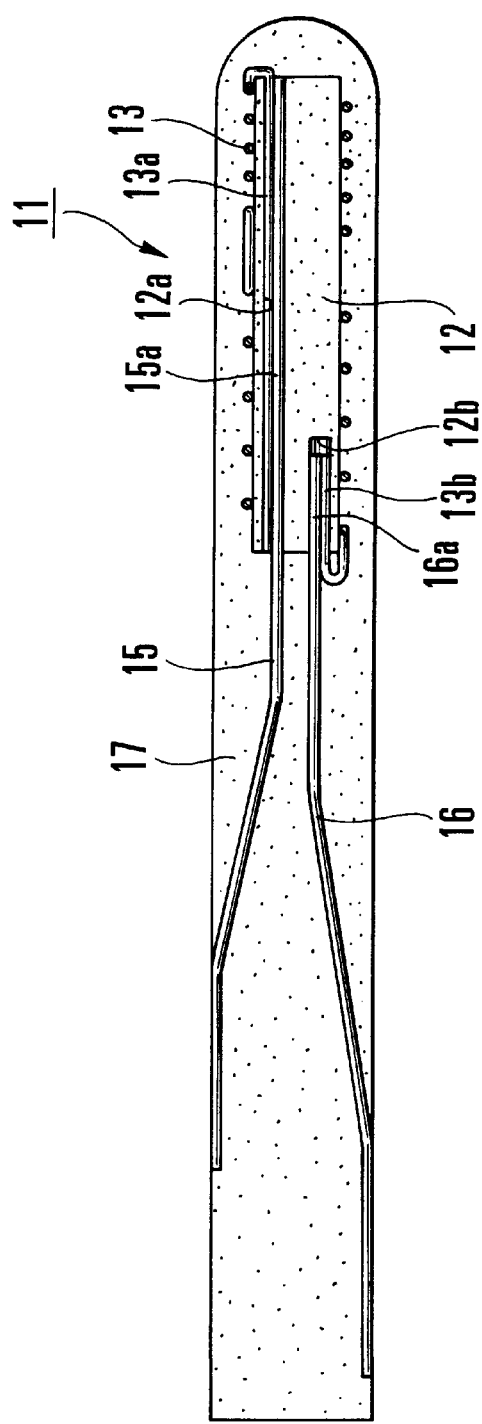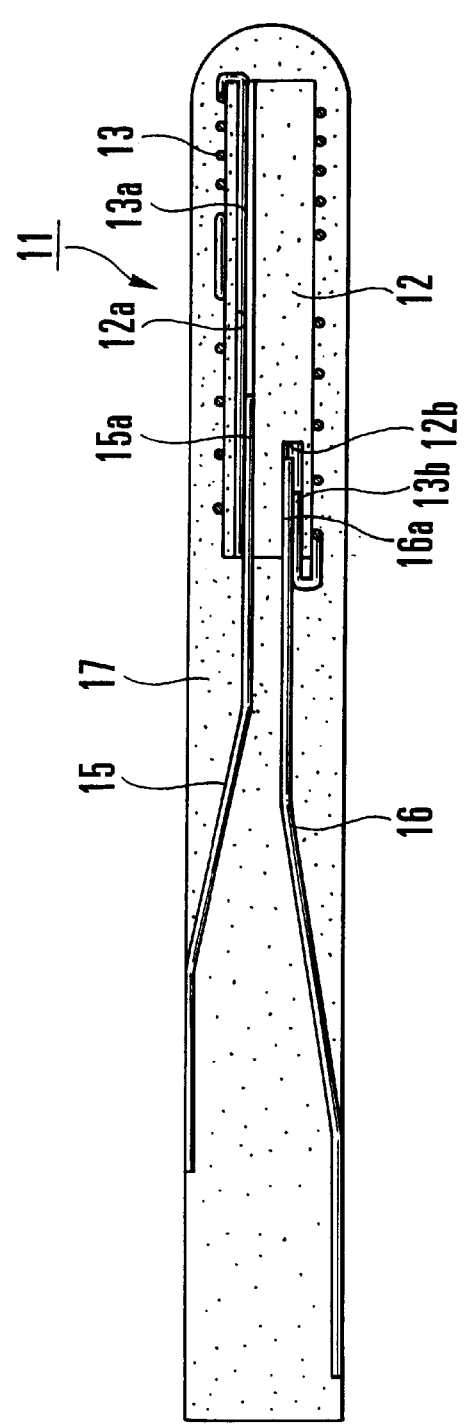

METAL MEMBER CONNECTING STRUCTURE, METAL MEMBER CONNECTING METHOD, CERAMIC HEATER, AND CERAMIC HEATER MANUFACTURING METHOD

BACKGROUND OF THE INVENTION

The present invention relates to a connecting structure for a refractory metal member difficult to connect by, e.g., welding, a metal member connecting method, a ceramic heater, and a ceramic heater manufacturing method.

A known example of a glow plug and the like for ignition of various heaters and combustors and auxiliary starting of a diesel engine uses a ceramic heater made from a high-temperature heating ceramic sintered body.

For example, Japanese Patent Laid-Open No. 55-126989 discloses a ceramic heater of this type in which a refractory metal such as tungsten (W) or a tungsten rhenium alloy (W—Re) is used as a heating element and buried in a silicon nitride insulating ceramic that is excellent in oxidation resistance and thermal shock resistance.

In this conventional ceramic heater, its distal end portion must function as a high-temperature heating portion. For this purpose, a metal member serving as a heating element is arranged at the distal end portion of the heater. One end of the metal member is wound around one end of a lead, or a straight portion of one end of the lead is inserted in a coiled portion of the metal member. The metal member and the lead are put in a ceramic powder and sintered to bury them in the ceramic sintered body.

In the ceramic heater manufactured by the above method, the electrical connection becomes unstable at the connecting portion between the metal member and the lead when the metal member serving as a heating element is wound around the straight portion of the lead or the straight portion of the lead is inserted in the coiled portion of the metal member in connecting, to the lead, the metal member serving as a heating element to be buried in the ceramic sintered body. The above winding operation makes automatic assembly of the metal member and the lead difficult. Accordingly, they are manually assembled, resulting in high cost.

In the use of a refractory metal, a connecting method using another member such as brazing cannot be employed. The refractory metal cannot be connected by welding of melting only a base material and joining the refractory metal. There is no joining means other than the above one, so any measure must be taken.

For example, Japanese Patent Laid-Open No. 58-110919 discloses a ceramic heater in a diesel engine glow plug in which a metal member serving as a control element for controlling a supply current to the heating element is series-connected to a metal member functioning as a heating element at the distal end portion of the heater, and buried in a ceramic sintered body. Further, another ceramic heater in which two types of metal members serving as control elements like the one described above are series-connected to more effectively control the supply current to the heating element is also known.

In the ceramic heater having such a structure, however, the above problem about joining of the metal member becomes more serious because a plurality of types of metal members serving as heating and control elements must be series-connected to each other and connected to leads. Particularly, since the ceramic heater uses a refractory metal member, a stable connecting state of the refractory metal by welding is difficult to obtain.

The above-described connection of metal members is required in not only the ceramic heater but also various electrical devices, and the above problems must be considered. For example, in connecting, to a lead, a refractory metal wire such as the filament of a light bulb or electron microscope, the same problem as in the ceramic heater also arises, and any measure must be taken.

SUMMARY OF THE INVENTION

It is, therefore, the principal object of the present invention to provide a metal member connecting structure using a smaller number of components and having stable electrical characteristics, a metal member connecting method, a ceramic heater, and a ceramic heater manufacturing method.

It is another object of the present invention to provide a metal member connecting structure suitable for connecting, e.g., refractory metal members to each other, a metal member connecting method, a ceramic heater, and a ceramic heater manufacturing method.

It is still another object of the present invention to provide a metal member connecting structure in which a metal member can be connected by a simple method using a known means without using any special discrete component, and electrical connection characteristics are stable, a metal member connecting method, a ceramic heater, and a ceramic heater manufacturing method.

In order to achieve the above objects, according to an aspect of the present invention, there is provided a metal member connecting structure for connecting at least two metal members, comprising a ceramic sintered body having a connecting member in which the two metal members are arranged in a connecting hole shrunk by sintering, and at least distal ends of the metal members overlap each other.

According to another aspect of the present invention, there is provided a metal member connecting method in a connecting structure for connecting at least two metal members, comprising the steps of inserting at least the two metal members in a connecting hole formed in a ceramic member, and sintering the two metal members while at least distal ends of the metal members overlap each other, thereby obtaining a connecting member for connecting the overlapping distal ends of the metal members by shrinkage of the ceramic member.

According to still another aspect of the present invention, there is provided a ceramic heater having at least a metal member functioning as a heating element, and lead metal members connected to two ends of the metal member, which are buried in an insulating ceramics, comprising a ceramic sintered body in which a connecting member is buried in the insulating ceramics while the metal member and the lead members are arranged in connecting holes shrunk by sintering, and at least distal ends of the metal member and the lead members overlap each other.

According to still another aspect of the present invention, there is provided a method of manufacturing a ceramic heater having at least a metal member functioning as a heating element, and leads connected to two ends of the metal member, which are buried in an insulating ceramics, comprising the steps of inserting the metal member and the lead members in through connecting holes of a ceramic member, and burying the metal member and the lead members in a ceramic powder, and sintering to join the metal member and the lead member while distal ends of the metal member and the lead members overlap each other, thereby obtaining a connecting member for connecting the overlapping distal ends of the metal member and the lead members by shrinkage of the ceramic member.

BRIEF DESCRIPTION OF THE DRAWINGS

FIG. 4 is a sectional view showing an embodiment of a ceramic heater and manufacturing method according to the present invention;

FIG. 4A is a sectional view taken along the line 4A—4A in FIG. 4;

FIGS. 6A and 6B are sectional views of the ceramic heater in FIG. 4;

DESCRIPTION OF THE PREFERRED EMBODIMENTS

Figure 1:
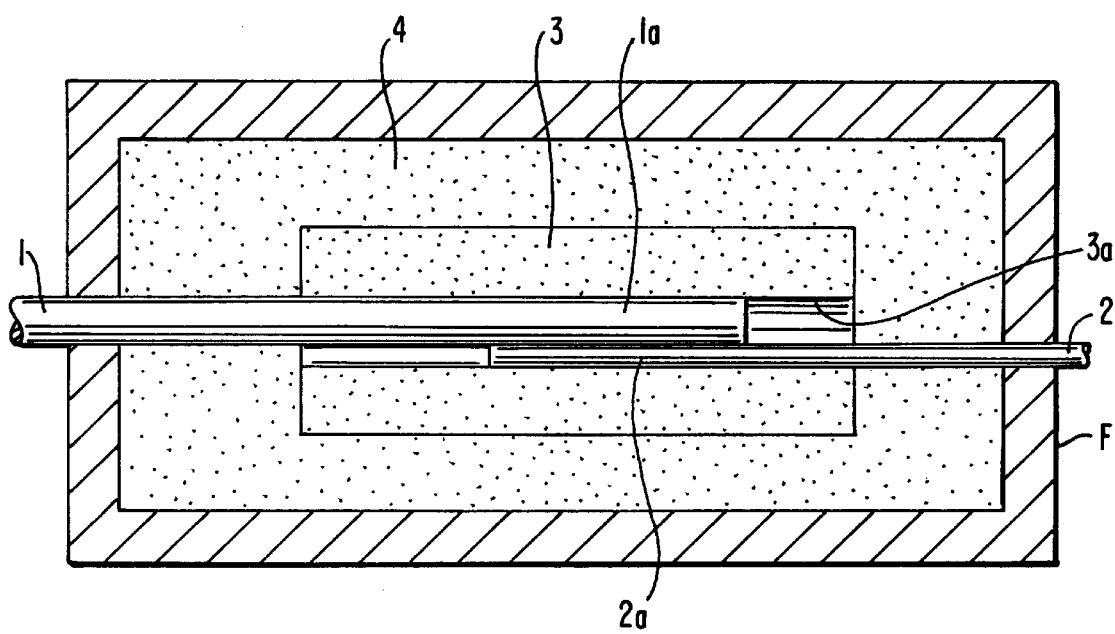
FIG. 1 is a sectional view showing one embodiment of the present invention.

FIGS. 1, 2A, 2B, and 2C show a metal member joining method according to an embodiment of the present invention. In FIGS. 1, 2A, 2B, and 2C, reference numerals 1 and 2 denote two metal members to be connected to each other. Examples of the metal members 1 and 2 are a tungsten wire (W wire), a tungsten-rhenium (3%) alloy wire (W—Re wire), and a molybdenum wire (Mo wire) each having a melting point of 2,000° C. or higher. Each metal member is not limited to the wire shape, and may have a striped shape, a combination of a striped shape and a wire shape, or another shape. More specifically, the melting temperatures of these metals are as follows.

The melting temperature of the W wire is about 3,400° C., that of the W—Re wire is about 3,000° C., and that of the Mo wire is about 2,620° C. Refractory metals having such a melting temperature are hafnium (about 2,230° C.), niobium (about 2,450° C.), and rhenium (about 3,180° C.). The wires of these refractory metals can also be used. Note that these melting temperatures are merely examples, and may change depending on their alloys and compositions, as a matter of course.

Reference numeral 3 denotes a connecting member used for joining the metal members 1 and 2 to each other and made of a green ceramic (ceramic green body) or a ceramic sintered to a certain degree. As shown in FIG. 2, the ceramic connecting member 3 is shaped into a thin round bar, and has a connecting hole 3a at its center. In this case, the shape of the connecting hole 3a is arbitrary such as a circular, elliptic, or rectangular shape. The connecting hole 3a has dimensions that allow overlapping of the distal end portions of the two metal members.

Figure 2A:
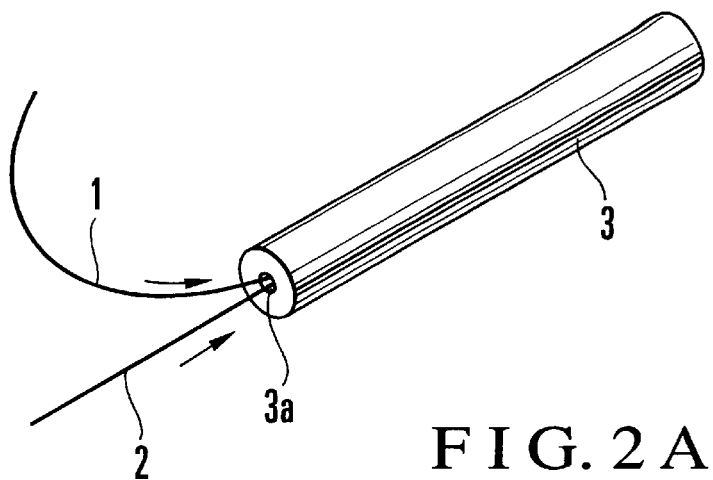
FIGS. 2A, 2B, and 2C are perspective views for explaining a metal member joining method according to the present invention.
Figure 2B:
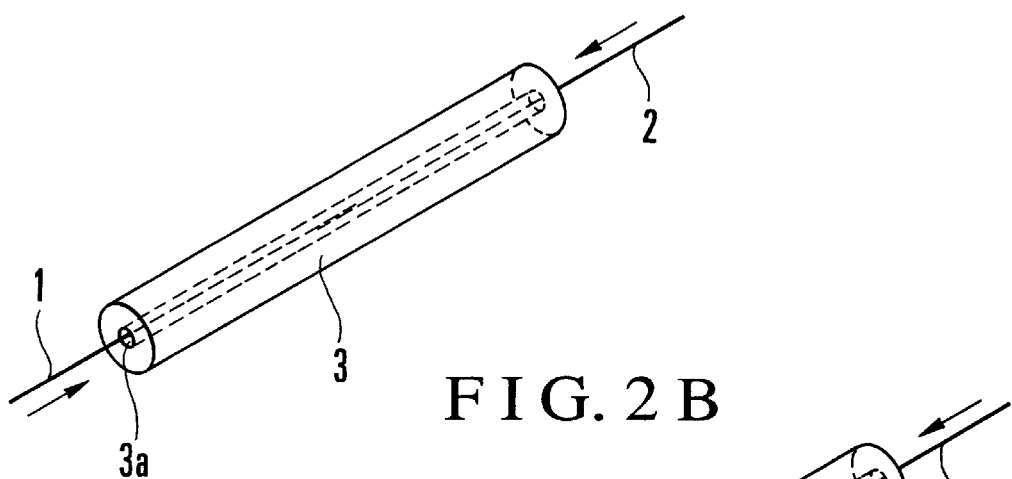
Figure 2C:
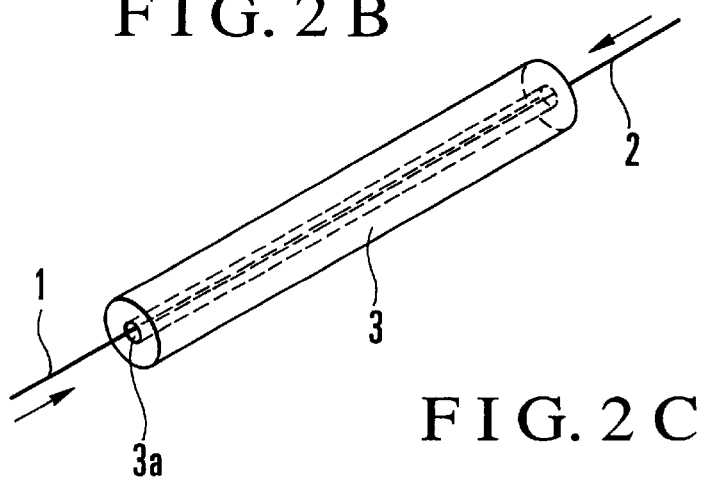

As shown in FIGS. 2A, 2B, and 2C, the metal members 1 and 2 are inserted in the hole 3a of the ceramic connecting member 3 such that at least their distal end portions overlap each other. These metal members may be inserted from the same side as shown in FIG. 2A, or different side as shown in FIGS. 2B and 2C. When the metal members 1 and 2 are inserted from the same side, as shown in FIG. 2A, the connecting hole 3a may be a through hole or a blind hole. FIG. 2B shows the state wherein only the distal end portions of the two metal members 1 and 2 overlap each other, and FIG. 2C shows the state wherein the metal members overlap each other over the whole region in the axis direction within the connecting hole 3a.

By sintering the ceramic connecting member 3 by gas-pressure sintering or hot-press sintering while the metal members 1 and 2 are inserted in the hole 3a and at least partially overlap each other, the whole connecting member 3 is shrunk by sintering, and joining ends 1a and 2a of the metal members 1 and 2 are pressure-welded to each other within the ceramic connecting hole 3a, as shown in FIG. 1. Accordingly, the two metal members 1 and 2 are completely electrically connected to each other.

FIG. 1 shows the state of forming an integral sintered body by putting the ceramic connecting member 3 containing the metal members 1 and 2 in the above manner, in a ceramic powder 4 surrounded by a frame F, and sintering the whole structure.

Although the ceramic powder is sintered with the frame F in FIG. 1, the frame F may be removed in sintering as far as it can mold the ceramic powder. This is because the ceramic powder can maintain its shape by a binder during molding.

The amount the ceramic connecting member 3 shrinks upon sintering depends on whether a green ceramic or a pre-sintered ceramic is used for the ceramic connecting member 3. It was experimentally confirmed that a green ceramic would shrink to about 70% of its original linear dimensions, while a pre-sintered ceramic would shrink to about 90% of its original linear dimensions. FIG. 1, when green ceramic is used, the two metal members can be electrically connected by shrinkage of the ceramic by setting the diameter of the hole formed in the ceramics 3 larger than the total thickness of the two metal members 1 and 2 upon overlapping, and smaller than 1.4 times the total thickness. When pre sintered ceramic is used 3 has been sintered, the two metal members can be electrically connected by shrinkage of the ceramics by setting the hole diameter larger than the total thickness of the two metal members upon overlapping and smaller than 1.1 times the total thickness.

Needless to say, the sintering temperature of the connecting member containing the refractory metal wires is lower than the melting temperature of the refractory metal in use.

This sintering temperature falls within a temperature range suitable for sintering various selected ceramics. For example, when the ceramic connecting members are made of an oxide such as alumina or zirconia, they are satisfactorily joined to each other even by atmospheric-pressure sintering, and a satisfactory strength is obtained. If the ceramic connecting members are made of silicon nitride, silicon carbide, or the like, a glass phase as a liquid phase prepared upon melting a sintering aids or the like allows to fill the hole 3a with it to obtain a satisfactory strength by adopting gas-pressure sintering or hot-press sintering as described above.

Part of the ceramic powder 4 is confirmed to enter the inside of the ceramic connecting member 3 also from the opening end of the connecting hole 3a and to more reliably join the metal members to each other when the ceramic powder 4 covers the ceramic connecting member 3, as shown in FIG. 1.

Even if the metal members 1 and 2 do not entirely overlap each other within the connecting hole 3a of the ceramic connecting member 3, as shown in FIGS. 1, 2A, and 2B, the metal members 1 and 2 can be reliably joined to each other because the hole 3a is collapsed upon sintering. The relationship between the diameter of the hole 3a and the metal members 1 and 2 need not be precise. Even in a hole having a small gap upon inserting the two wires 1 and 2 therein, the wires 1 and 2 can be satisfactorily joined to each other.

For refractory metal members 1 and 2, the sintering process occurs in a non-oxide atmosphere so as not to oxidize the refractory metal members. That is, this sintering is preferably performed in any one of the vacuum, nitrogen, inert, and reduction atmospheres.

Although the case of joining the two metal members 1 and 2 has been exemplified, the present invention is not limited to this. A larger number of metal members can be simultaneously inserted and integrally joined to each other. In sequentially joining many metal members, a plurality of holes can be formed in the ceramic connecting member 3, and the metal members can be respectively inserted in the holes and joined. Further, the case wherein the ceramic connecting member 3 is covered with the ceramic powder 4 and sintered has been described, but the present invention is not limited to this. The ceramic connecting member 3 in which the metal members are inserted may be directly sintered.

Figure 3:
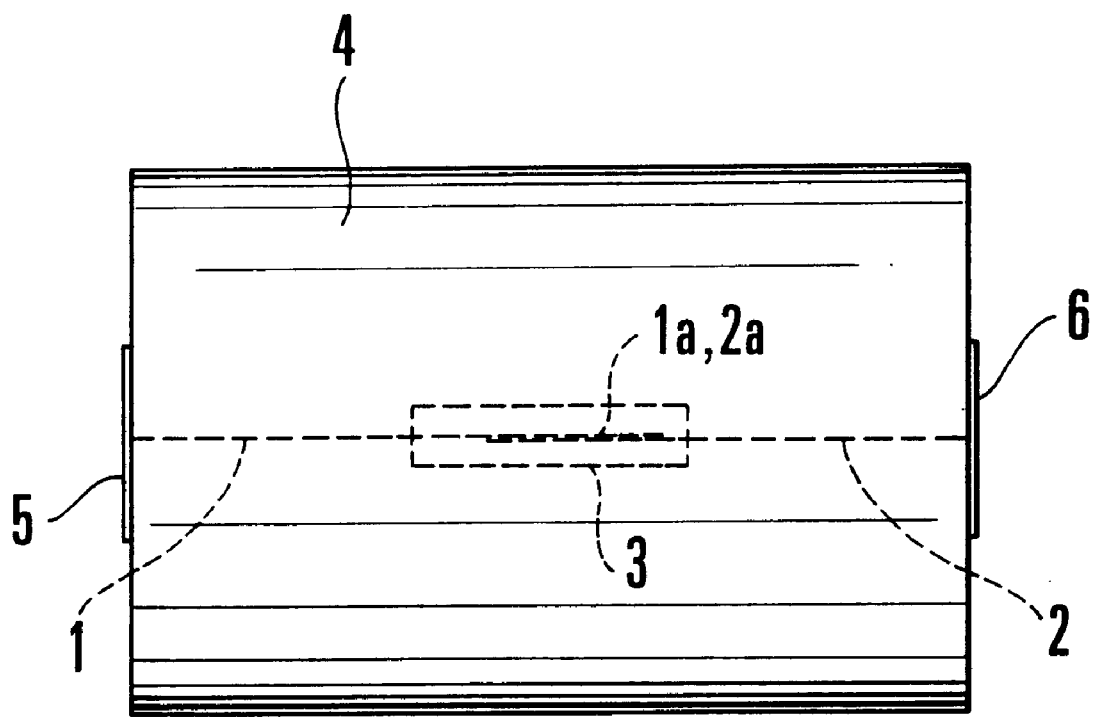
FIG. 3 is a sectional view showing a modification of the metal member joining method in FIG. 1.

FIG. 3 shows a modification of the joining method in FIG. 1. The external ends of the metal members 1 and 2 are exposed on surfaces of a sintered body made of the ceramic powder 4, and conductive layers 5 and 6 such as a silver paste are formed on these external ends to externally electrically connect the metal members 1 and 2.

Figure 5:
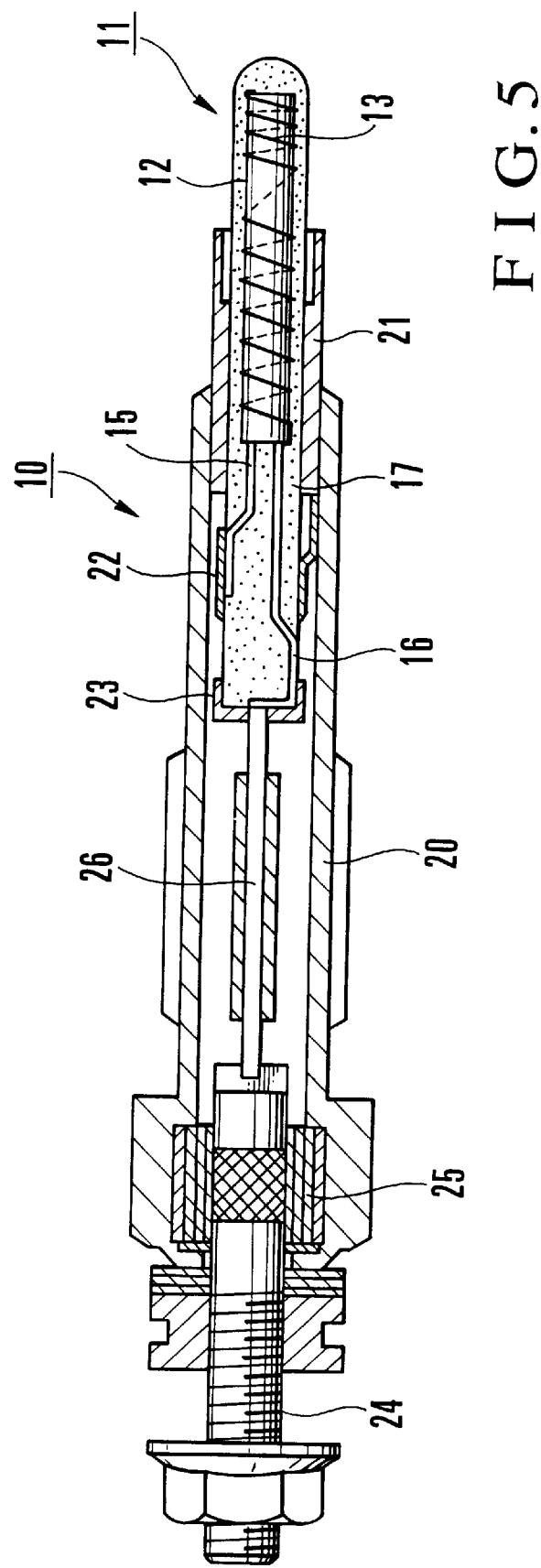
FIG. 5 is a sectional view of a diesel engine glow plug using the ceramic heater in FIG. 4.

FIGS. 4, 4A, and 5 show an application of the present invention described above with reference to FIGS. 1 and 2A to 2C to a ceramic heater 11 for a diesel engine glow plug 10 or the like.

In manufacturing this ceramic heater 11, a metal member 13 made of a refractory metal and metal members 15 and 16 serving as leads which are respectively inserted in holes 12a and 12b formed parallel in a ceramic bar 12 are buried in a ceramic powder 17, and sintered to sequentially join them to each other.

The metal member 15 serving as one lead is inserted in one hole 12a of the ceramic body 12 from one end of the ceramic body 12 to store a distal end 15a of the metal member 15 in the hole 12a while overlapping one end 13a of the metal member 13 serving as a heating element inserted from the other end of the ceramic body 12. In the other hole 12b, a distal end 16a of the metal member 16 serving as the other lead is inserted from the same side as the metal member 15. In this case, the metal member 16 is inserted to an intermediate portion of the hole 12b while overlapping the other end 13b of the metal member 13 on the same side of the hole 12b. This state is shown in detail in FIG. 4. FIG. 4A shows a cross section (cross section in the direction 4A—4A of FIG. 4) at the distal end of the ceramic body 12, and shows the joining state of the metal members 15 and 13 (particularly 13a). As described above, the two ends of the metal member 13 respectively overlap the metal members 15 and 16 serving as leads. The intermediate portion of the metal member 13 is wound around the ceramic body 12, and made up of a tightly wound portion S1 serving as a heating element at the distal end of the ceramic body 12, and a roughly wound portion S2 serving as a control element on the inner side.

The ceramic heater 11 is used in the glow plug 10 shown in FIG. 5. In FIG. 5, reference numeral 20 denotes a housing main body serving as a fitting for the diesel engine glow plug 10; 21, an auxiliary metal pipe for holding the ceramic heater 11 while extending through the ceramic heater 11, and joining the ceramic heater 11 to the distal end portion of the housing main body 20; 22, a terminal ring which is fitted on the exposed portion of the metal member 15 serving as one lead at the proximal end of the heater, and electrically connected to the pipe 21; and 23, a terminal member attached to the proximal end portion of the heater 11 and connected to the exposed portion of the metal member 16 serving as the other lead.

Reference numeral 24 denotes an external connecting terminal held at the proximal end portion of the housing main body 20 via an insulated bushing 25; and 26, a lead wire for connecting the external connecting terminal 24 to the terminal member 23. The structure and function of the glow plug 10 are conventionally, widely known, and a description thereof will be omitted.

In this structure, the ceramic body 12 having the holes 12a and 12b formed therein is used, and the metal member 13 is spirally wound around the ceramic body 12. The metal members 15 and 16 serving as leads are respectively inserted in the holes 12a and 12b, and buried in the ceramic powder 17. Then, like the above-described embodiment, this assembly is sintered in any one (non-oxide atmosphere) of the vacuum, nitrogen, inert, and reduction atmospheres to pressure-weld the joining ends of necessary portions to each other upon shrinkage of the ceramics by sintering, and obtain a connecting structure satisfactory in strength and electrical characteristics.

Particularly, it is very difficult to join the metal member 13 made of a refractory metal serving as heating and control elements to the metal members 15 and 16 serving as leads by welding, and to sinter the ceramic powder 17 around them. According to the present invention, however, the ceramic heater 11 can be constituted by easily joining necessary portions to each other with a simple operation without requiring any cumbersome operation.

FIGS. 6A and 6B show another detailed example of the ceramic heater in FIG. 4. More specifically, FIG. 6A exemplifies the case wherein the hole 12a is a through hole, the hole 12b is a blind hole, the metal member 15 serving as a lead and a portion of the metal member 13 serving as a heating element are arranged to entirely overlap each other within the through hole 12a of the ceramic body 12, and the metal member 16 serving as a lead and a portion of the metal member 13 serving as a control element are inserted by the same length to overlap each other within the other hole 12b serving as the blind hole.

FIG. 6B shows the case wherein the metal members 15 and 16 and the two ends 13a and 13b of the metal member 13 only partially overlap each other.

In FIGS. 6A and 6B, the metal member 13 wound around the ceramic body 12 suffices to be in a wound state, and need not contact the outer surface of the ceramic body 12.

Figure 7:
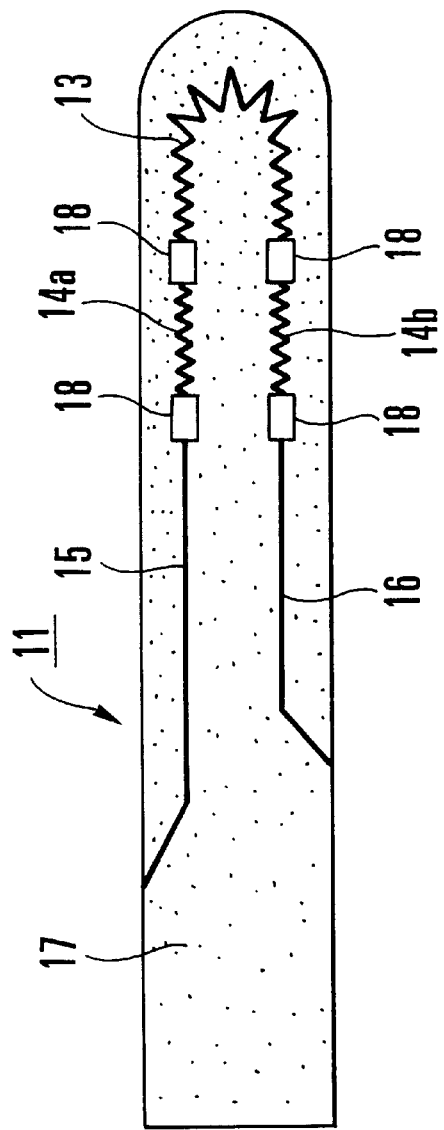
FIG. 7 is a sectional view showing another embodiment of a ceramic heater and manufacturing method according to the present invention.
Figure 8:
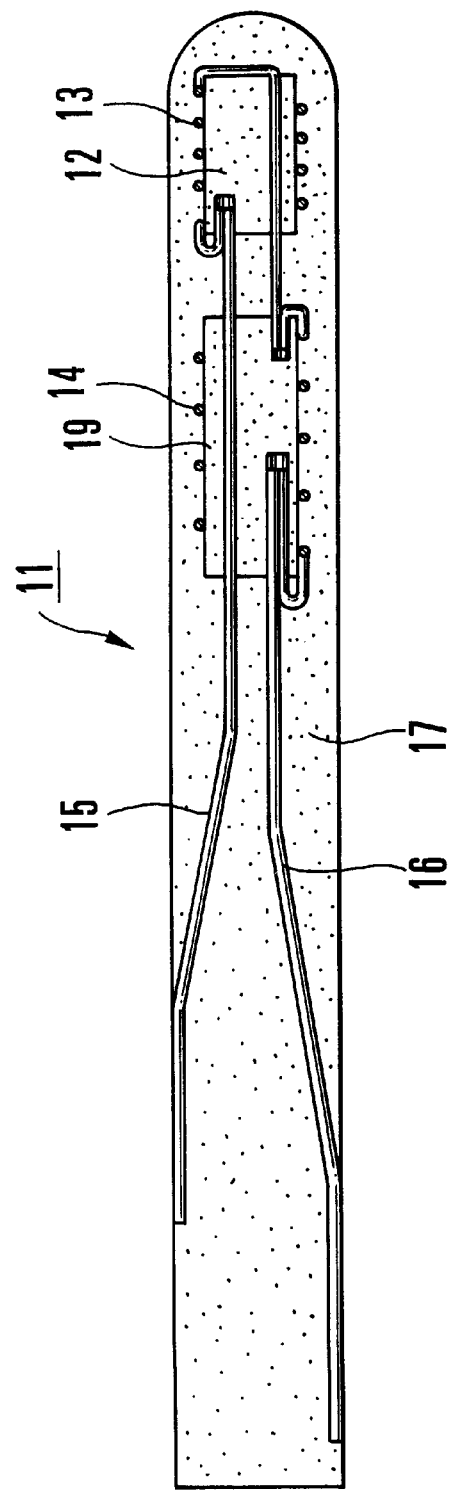
FIG. 8 is a sectional view showing still another embodiment of a ceramic heater and manufacturing method according to the present invention.

FIGS. 7 and 8 respectively show other embodiments of the ceramic heater. These embodiments use a first metal member 13 serving as a heating element, and in addition second metal members 14a and 14b or a second metal member 14 serving as a control element made of a material having a larger positive resistance temperature coefficient than that of the first metal member 13.

In the embodiment shown in FIG. 7, joining ceramic bodies 18 are used at the connecting portions between the first metal member 13 and the second metal members 14a and 14b, the second metal members 14a and 14b and metal members 15 and 16 serving as leads, and they are buried in a ceramic powder 17, which is then sintered to join the metal members. The first metal member 13 and the second metal members 14a and 14b may be formed into a coiled shape or a corrugated shape.

In the embodiment shown in FIG. 8, a ceramic body 19 for connecting the second metal member 14 to the first metal member 13 and the metal member 16 serving as a lead is used other than the ceramic body 12 for joining the first metal member 13, and they are buried in the ceramic powder 17, which is then to constitute the ceramic heater 11.

The connection of the first and second metal members 13 and 14 and the metal members 15 and 16 serving as leads is not limited to the embodiment in FIG. 8, and may be performed by either ceramic body 12 or 19.

By using both the first metal member 13 serving as a heating element and the second metal members 14a and 14b or second metal member 14 serving as a control element, as in these embodiments, the heater 11 can have a self-temperature saturation function of rapidly generating red heat at the distal end portion of the heater 11, saturating the heating temperature after the lapse of a predetermined time, and obtaining a heating temperature lower than the saturation temperature upon starting the engine to perform so-called afterglow.

The present invention is not limited to the structure described in the above embodiments, and the shape and structure of each portion can be properly modified and changed.

In the above embodiments, the present invention is applied to the ceramic heater 11 used in the diesel engine glow plug 10. The present invention is not limited to this, and can be applied to various devices and apparatuses in which at least two metal members must be joined to each other by winding one metal material around the other metal member, or inserting one wire into the coiled portion of the other wire, like the filament of a light bulb or electron microscope.

In short, the present invention can be applied to various devices and apparatuses as far as holes are formed in a ceramic green body or sintered body (ceramic body) in joining two or more metal members, and the metal members are inserted in the holes and joined to each other by sintering.

EXAMPLE 1

Two tungsten wires each having a diameter of 0.1 mm were inserted from the same side in a hole having an inner diameter (hole diameter) of 0.22 mm formed in a green alumina body (extruded body) having an outer diameter of 2 mm and a length of 1 cm. In this case, three assemblies in each of which two tungsten wires overlapped each other within a hole, as shown in FIG. 2A, were fabricated. They were respectively sintered in the vacuum at hydrogen:argon=1:3, and nitrogen atmospheres at a temperature of 1,600° C. for 3 hr.

The tungsten wires were confirmed to be pressure-welded in the ceramic green body by shrinkage the ceramics, not to be manually pulled out, and to have conductivity satisfactory in electrical characteristics.

EXAMPLE 2

Tungsten and molybdenum wires each having a diameter of 0.2 mm were respectively inserted in a green body (extruded body) having an outer diameter of 2.45 mm, an inner diameter (hole diameter) of 0.42 mm, and a length of 1 cm and made of silicon nitride (containing 8% yttria as a sintering aids) so as to entirely overlap each other in the green body, as shown in FIG. 2C. This assembly was buried in a carbon crucible containing a filling powder, and gas-pressure-sintered in the nitrogen atmosphere at 0.93 MPa and a temperature of 1,800° C.

The tungsten and molybdenum wires were confirmed to be joined in the ceramics, not to be manually pulled out, and to have conductivity satisfactory in electrical characteristics.

EXAMPLE 3

Two tungsten wires each having a diameter of 0.2 mm were inserted in a sintered body of a conductive ceramics (30 wt % titanium nitride-64 wt % silicon nitride-6 wt % yttria) having an outer diameter of 2.45 mm, an inner diameter (hole diameter) of 0.42 mm, and a length of 1 cm so as to entirely overlap each other in the sintered body. This assembly was buried in a carbon crucible containing a filling powder, and gas-pressure-sintered in the nitrogen atmosphere at 0.93 MPa and a temperature of 1,800° C.

The tungsten wires were confirmed to be joined in the ceramics, not to be manually pulled out, and to have conductivity satisfactory in electrical characteristics.

EXAMPLE 4

Two tungsten wires each having a diameter of 0.2 mm were inserted in a sintered body made of silicon nitride (containing 5% yttria and 4% tantalum nitride) having an outer diameter of 2.5 mm, an inner diameter (hole diameter) of 0.43 mm, and a length of 5 mm to entirely overlap each other in the sintered body. This assembly was buried in a ceramic powder having the same composition, and uniaxially press-molded. The molding was hot-press-sintered. The hot-press sintering was performed in the nitrogen atmosphere at a press pressure of 340 MPa and a temperature of 1,800° C. for 1 hr. The sintered body was cut to externally expose the end portions of the tungsten wires, as shown in FIG. 3. After a silver paste was applied on the two ends, the conductivity was confirmed.

EXAMPLE 5

A columnar silicon nitride sintered body having two through holes with a diameter of 0.63 mm formed in the longitudinal direction was prepared. A tungsten wire having a diameter of 0.2 mm was wound around the sintered body in a coiled shape. Tungsten leads each having a diameter of 0.4 mm, and the ends of the tungsten wire with a diameter of 0.2 mm wound around the sintered body were inserted in the two through holes of the silicon nitride sintered body. This assembly was buried in a silicon nitride powder having the same composition and hot-press-sintered to fabricate a glow plug ceramic heater 11 like the one shown in FIG. 4.

The externally exposed terminals were confirmed to be conductive.

As has been described above, according to the present invention, at least two refractory metal members are inserted in through or blind holes formed in a connecting member made up of a green or sintered ceramics, and sintered in a non-oxide atmosphere such as the vacuum, nitrogen, inert, or reduction atmosphere. As a result, the ceramics serving as the connecting member shrinks during sintering to pressure-weld the metal members inserted in the holes to each other. Accordingly, the joined body satisfactory in terms of the strength and electrical connection can be obtained.

According to the present invention, no cumbersome operation is required unlike a conventional ceramic heater in which metal members difficult in welding are joined by winding or insertion into a coiled portion so as to electrically connect them.

According to the ceramic heater and manufacturing method of the present invention, even in manufacturing a ceramic heater in which a spiral metal member is buried, joining of metals and sintering of a ceramic can be simultaneously performed without inserting a lead portion in the coiled portion of the metal member, resulting in low cost.

More specifically, in a conventional ceramic heater, when metal members are wound or inserted in a coiled portion, and then buried in a ceramic powder and sintered, the assembled member is easily decentered in burying the wound or inserted portion in the movable powder. If the diameter of the sintered body is adjusted upon sintering, the buried heating wire may be externally exposed. To the contrary, according to the present invention, metal members to be connected are tightly held within holes formed in a ceramic connecting member by shrinkage of the ceramics caused by sintering. For this reason, the assembled member is hardly decentered and easily positioned without posing any conventional problem.

In a conventional ceramic heater wherein, e.g., a refractory metal is buried as a heating element in a ceramic sintered body, to use the distal end portion of the heater as a high-temperature heating portion, the refractory metal is electrically connected by caulking a coiled portion and a lead portion, thereby forming a heating element. As a method of manufacturing this heating element, after the coiled portion is wound, a processed lead portion is inserted in the coiled portion. However, the resistance easily becomes unstable at the wound and inserted portions. In addition, automatic insertion of the lead portion is difficult to realize, and the cost is high. To the contrary, according to the present invention, these problems can be solved.

What is claimed is:

1. A connecting structure for connecting at least two metal members, the connecting structure comprising:

a first metal member having a first distal end;

a second metal member having a second distal end; and a bar-shaped ceramic connecting member in which a connecting hole is defined in the longitudinal direction of the ceramic connecting member, the first distal end and the second distal end having been inserted into the connecting hole, the first distal end at least partially overlapping the second distal end, wherein the bar-shaped ceramic connecting member has been sintered after insertion of the first distal end and the second distal end into the connecting hole to shrink the connecting hole and electrically couple the first metal member to the second metal member.

2. A structure according to claim 1, wherein each of said metal members is made of a refractory material having a melting point of not less than 2,000° C.

3. A structure according to claim 1, further including a filler at least partially filling the connecting hole.

4. A structure according to claim 1, wherein the connecting hole is a through hole.

5. A structure according to claim 1, wherein the connecting hole is a blind hole.

6. A method of connecting at least two metal members, the method comprising:

inserting said at least two metal members in a connecting hole formed in a ceramic connecting member, and sintering to join said metal members while at least distal ends of said metal members overlap each other due to shrinkage, thereby obtaining a connecting member for connecting said overlapping distal ends of said metal members by shrinkage of said ceramic member.

7. A method according to claim 6, wherein each of said metal members is made of a refractory material having a melting point of not less than 2,00° C.

8. A method according to claim 6, wherein the sintering step is performed in a non-oxide atmosphere.

9. A method according to claim 8, wherein the non-oxide atmosphere is one atmosphere selected from the group consisting of vacuum, a nitrogen atmosphere, an inert atmosphere, and a reduction atmosphere.

10. A method according to claim 6, wherein sintering of said ceramic member is performed by hot-press sintering.

11. A method according to claim 6, wherein sintering of said ceramic member is performed by gas-pressure sintering.

12. A method according to claim 6, wherein said ceramic member is a ceramic green body.

13. A method according to claim 6, wherein said ceramic member is a ceramic sintered body.

14. A ceramic heater having at least a metal member functioning as a heating element, and lead metal members connected to two ends of said metal member, which are buried in an insulating ceramic, comprising:

a ceramic sintered body, in which a ceramic connecting member having connecting holes is buried in said insulating ceramic, said metal member and said lead members being arranged in said connecting holes so that at least distal ends of said metal member and said lead members overlap each other, said connecting holes being shrunk around said metal member and said lead members by sintering to electrically couple said lead members to said metal member.

15. A heater according to claim 14, wherein said metal member is made up of a tightly wound portion functioning as a heating element and a roughly round portion functioning as a control element.

16. A heater according to claim 14, wherein said metal member is made of a refractory material having a melting point of not less than 2,000° C.

17. A method of manufacturing a ceramic heater having at least a metal member functioning as a heating element, and leads connected to two ends of said metal member, which are buried in an insulating ceramic, the method comprising:

inserting said metal member and said lead members in through connecting holes of a ceramic member;

burying said metal member and said lead members in a ceramic powder; and sintering said ceramic member with said inserted metal member and lead members to connect said metal member and said lead member while distal ends of said metal member and said lead members overlap each other, thereby obtaining a connecting member for connecting said overlapping distal ends of said metal member and said lead members by shrinkage of said ceramic member.

18. A method according to claim 17, wherein said metal member is made of a refractory material having a melting point of not less than 2,000° C.

19. A method according to claim 17, wherein sintering of said ceramic member is performed in a non-oxide atmosphere.

20. A method according to claim 19, wherein the non-oxide atmosphere is one atmosphere selected from the group consisting of vacuum, a nitrogen atmosphere, an inert atmosphere, and a reduction atmosphere.

21. A method according to claim 17, wherein sintering of said ceramic member is performed by hot-press sintering.

22. A method according to claim 17, wherein sintering of said ceramic member is performed by gas-pressure sintering.

23. A method according to claim 17, wherein said ceramic member is a ceramic green body.

24. A method according to claim 17, wherein said ceramic member is a ceramic sintered body.

* * * * *